(12) United States Patent
Kawamoto et al.

(10) Patent No.: US 9,771,461 B2
(45) Date of Patent: Sep. 26, 2017

(54) METHOD FOR PRODUCING RUBBER COMPOSITION AND RUBBER COMPOSITION

(71) Applicants: NISSIN KOGYO CO., LTD., Nagano (JP); SHINSHU UNIVERSITY, Matsumoto-shi, Nagano (JP)

(72) Inventors: Keiichi Kawamoto, Nagano (JP); Hiroyuki Ueki, Nagano (JP); Toru Noguchi, Nagano (JP); Kenichi Niihara, Nagano (JP)

(73) Assignees: NISSIN KOGYO CO., LTD., Nagano (JP); SHINSHU UNIVERSITY, Matsumoto (JP)

( * ) Notice: Subject to any disclaimer, the term of this patent is extended or adjusted under 35 U.S.C. 154(b) by 0 days.

(21) Appl. No.: 14/515,616

(22) Filed: Oct. 16, 2014

(65) Prior Publication Data

US 2015/0111998 A1   Apr. 23, 2015

(30) Foreign Application Priority Data

Oct. 17, 2013   (JP) .................. 2013-216804
Sep. 17, 2014   (JP) .................. 2014-188852

(51) Int. Cl.
*C08J 3/215*   (2006.01)
*B29C 43/24*   (2006.01)
(Continued)

(52) U.S. Cl.
CPC .............. *C08J 3/215* (2013.01); *B29B 7/56* (2013.01); *B29B 7/90* (2013.01); *B29C 43/24* (2013.01);
(Continued)

(58) Field of Classification Search
CPC .... C08J 3/215; C08J 43/24; C08J 3/16; B29C 43/24; C08K 7/02
See application file for complete search history.

(56) References Cited

U.S. PATENT DOCUMENTS 3,653,436 A    4/1972   Anderson et al.
4,714,119 A   12/1987   Hebert et al.
(Continued)

FOREIGN PATENT DOCUMENTS

JP    2013-014699 A    1/2013
JP    A-2013-18918     1/2013
(Continued)

OTHER PUBLICATIONS

Machine translation of JP 2013-018918. Jan. 31, 2013.*
U.S. Appl. No. 15/140,123, filed Apr. 27, 2016 in the name of Kenichi Niihara et al.

*Primary Examiner* — John Uselding
(74) *Attorney, Agent, or Firm* — Oliff PLC

(57) ABSTRACT

A method for producing a rubber composition include a mixing step, a drying step, and a dispersion step. In the mixing step, an aqueous solution that includes at least one of oxycellulose fibers and cellulose nanofibers is mixed with rubber latex to obtain a first mixture. In the drying step, the first mixture is dried to obtain a second mixture. In the dispersion step, the second mixture is tight-milled using an open roll to obtain a rubber composition. The rubber composition does not include an aggregate that includes at least one of the oxycellulose fibers and the cellulose nanofibers, and has a diameter of 0.1 mm or more.

3 Claims, 4 Drawing Sheets

(51) Int. Cl.
    C08J 3/16      (2006.01)
    C08K 7/02      (2006.01)
    B29B 7/56      (2006.01)
    B29B 7/90      (2006.01)
    C08L 15/00     (2006.01)
    C08L 9/04      (2006.01)
    B29K 1/00      (2006.01)
    B29K 7/00      (2006.01)

(52) U.S. Cl.
    CPC ..... *C08J 3/16* (2013.01); *C08K 7/02* (2013.01); *C08L 9/04* (2013.01); *C08L 15/00* (2013.01); *C08L 15/005* (2013.01); *B29C 43/245* (2013.01); *B29K 2001/00* (2013.01); *B29K 2007/00* (2013.01); *B29K 2995/0062* (2013.01); *C08J 2315/00* (2013.01); *C08K 2201/011* (2013.01); *C08K 2201/014* (2013.01)

(56) References Cited

U.S. PATENT DOCUMENTS

| | | | |
|---|---|---|---|
| 4,758,618 A * | 7/1988 | Ito ........................... | C08F 8/26 |
| | | | 524/430 |
| 4,782,695 A | 11/1988 | Glotin et al. | |
| 4,860,581 A | 8/1989 | Zimmerman et al. | |
| 6,058,773 A | 5/2000 | Zimmerman et al. | |
| 6,179,055 B1 | 1/2001 | Sallwasser et al. | |
| 6,467,544 B1 | 10/2002 | Brown et al. | |
| 6,604,922 B1 | 8/2003 | Hache | |
| 6,758,090 B2 | 7/2004 | Bostrom et al. | |
| 7,083,008 B2 | 8/2006 | Thorp et al. | |
| 7,188,685 B2 | 3/2007 | Downton et al. | |
| 7,191,831 B2 | 3/2007 | Reid et al. | |
| 7,392,851 B2 | 7/2008 | Brennan, III et al. | |
| 7,461,547 B2 | 12/2008 | Terabayashi et al. | |
| 7,578,342 B2 | 8/2009 | Brennan, III et al. | |
| 2006/0157283 A1 | 7/2006 | Hart | |
| 2006/0216178 A1 | 9/2006 | Sindt et al. | |
| 2007/0197714 A1 * | 8/2007 | Okamoto .............. | C08F 136/06 |
| | | | 524/493 |
| 2009/0078412 A1 | 3/2009 | Kanayama et al. | |
| 2009/0133932 A1 | 5/2009 | Church | |
| 2009/0253852 A1 | 10/2009 | Noguchi et al. | |
| 2010/0009160 A1 * | 1/2010 | Noguchi ............... | B82Y 30/00 |
| | | | 428/297.4 |
| 2011/0156355 A1 | 6/2011 | Noguchi et al. | |
| 2011/0156357 A1 | 6/2011 | Noguchi et al. | |
| 2011/0160375 A1 | 6/2011 | Noguchi et al. | |
| 2013/0303657 A1 * | 11/2013 | Miyazaki ................ | C08K 7/02 |
| | | | 523/156 |
| 2013/0338255 A1 * | 12/2013 | Naka .................... | B60C 1/0016 |
| | | | 523/155 |
| 2015/0065635 A1 | 3/2015 | Noguchi et al. | |
| 2015/0111998 A1 | 4/2015 | Kawamoto et al. | |

FOREIGN PATENT DOCUMENTS

| | | |
|---|---|---|
| JP | 2013-023575 A | 2/2013 |
| WO | 2009/125503 A1 | 10/2009 |
| WO | 2011/077595 A1 | 6/2011 |
| WO | 2011/077598 A1 | 6/2011 |
| WO | 2011077596 A1 | 6/2011 |

* cited by examiner

METHOD FOR PRODUCING RUBBER COMPOSITION AND RUBBER COMPOSITION

Japanese Patent Application No. 2013-216804 filed on Oct. 17, 2013, and Japanese Patent Application No. 2014-188852 filed on Sep. 17, 2014, are hereby incorporated by reference in their entirety.

BACKGROUND OF THE INVENTION

The present invention relates to a method for producing a rubber composition that utilizes at least one of oxycellulose fibers and cellulose nanofibers, and a rubber composition that includes at least one of oxycellulose fibers and cellulose nanofibers.

In recent years, cellulose nanofibers obtained by untangling natural cellulose fibers to have a nanosize have attracted attention. Natural cellulose fibers are biomass produced using pulp (wood) as a raw material, and it is expected that environmental burdens can be reduced by effectively utilizing natural cellulose fibers.

For example, a method for producing a rubber composition has been proposed that includes a step that mixes rubber latex with an aqueous dispersion of cellulose fibers, and removes at least part of water from the mixture to obtain a cellulose fiber-rubber composite, and a step that mixes the composite with rubber (see JP-A-2013-18918, for example).

However, since the cellulose fibers form a hydrogen bond, and aggregate during the drying step that removes part of water from the mixture, the aggregates (masses) of the cellulose fibers remain in the rubber composition. Since the aggregates of the cellulose fibers are defects in the rubber composition, the rubber composition cannot be sufficiently reinforced by the cellulose fibers.

SUMMARY

The invention may provide a method for producing a rubber composition that utilizes at least one of oxycellulose fibers and cellulose nanofibers in an untangled state, and a rubber composition that includes at least one of oxycellulose fibers and cellulose nanofibers in an untangled state.

According to a first aspect of the invention, a method for producing a rubber composition includes:

a mixing step that mixes an aqueous solution that includes at least one of oxycellulose fibers and cellulose nanofibers with rubber latex to obtain a first mixture;

a drying step that dries the first mixture to obtain a second mixture; and a dispersion step that tight-mills the second mixture using an open roll to obtain a rubber composition.

According to a second aspect of the invention, a rubber composition is obtained using the method for producing a rubber composition, and includes at least one of oxycellulose fibers and cellulose nanofibers that are dispersed therein in an untangled state.

According to a third aspect of the invention, a rubber composition includes rubber, and at least one of oxycellulose fibers and cellulose nanofibers that are dispersed in the rubber in an untangled state, the rubber composition not including an aggregate that includes at least one of the oxycellulose fibers and the cellulose nanofibers, and has a diameter of 0.1 mm or more.

DETAILED DESCRIPTION OF THE EMBODIMENT

Figure 1:
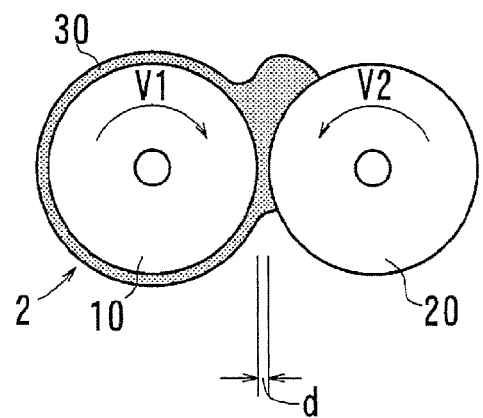
FIG. 1 is a diagram schematically illustrating a dispersion step included in a method for producing a rubber composition according to one embodiment of the invention.

A method for producing a rubber composition according to one embodiment of the invention includes:

a mixing step that mixes an aqueous solution that includes at least one of oxycellulose fibers and cellulose nanofibers with rubber latex to obtain a first mixture;

a drying step that dries the first mixture to obtain a second mixture; and a dispersion step that tight-mills the second mixture using an open roll (open roll mill) to obtain a rubber composition.

According to the method for producing a rubber composition according to one embodiment of the invention, a rubber composition in which at least one of the oxycellulose fibers and the cellulose nanofibers are dispersed in an untangled state can be obtained by tight-milling the second mixture using the open roll. Therefore, the method for producing a rubber composition can provide a rubber composition that is reinforced by at least one of the oxycellulose fibers and the cellulose nanofibers, and exhibits excellent rigidity, strength, and fatigue resistance.

In the method for producing a rubber composition, the aqueous solution may include at least one of the oxycellulose fibers and the cellulose nanofibers in a ratio of 0.1 to 10 mass %.

In the method for producing a rubber composition, the dispersion step may tight-mill the second mixture that includes at least one of the oxycellulose fibers and the cellulose nanofibers in an amount of 0.1 to 10 parts by mass based on 100 parts by mass of rubber, using the open roll at a roll distance of 0 to 0.5 mm and a roll temperature of 0 to 50° C.

In the method for producing a rubber composition, the mixing step may be performed using three or more rolls.

In the method for producing a rubber composition, the oxycellulose fibers may have an average fiber diameter of 10 to 30 micrometers, and the cellulose nanofibers may have an average fiber diameter of 1 to 200 nm.

The method for producing a rubber composition may further include a coagulation step that is performed between the mixing step and the drying step, the coagulation step coagulating the rubber latex included in the first mixture.

A rubber composition according to one embodiment of the invention is obtained using the method for producing a rubber composition, and includes at least one of oxycellulose fibers and cellulose nanofibers that are dispersed therein in an untangled state.

The rubber composition according to one embodiment of the invention is reinforced by at least one of the oxycellulose fibers and the cellulose nanofibers that are dispersed therein in an untangled state, and exhibits excellent rigidity, strength, and fatigue resistance.

A rubber composition according to one embodiment of the invention includes rubber, and at least one of oxycellulose fibers and cellulose nanofibers that are dispersed in the rubber in an untangled state, the rubber composition not including an aggregate that includes at least one of the oxycellulose fibers and the cellulose nanofibers, and has a diameter of 0.1 mm or more.

The rubber composition according to one embodiment of the invention is reinforced by aggregates including at least one of the oxycellulose fibers and the cellulose nanofibers that are dispersed therein in an untangled state, and exhibits excellent rigidity, strength, and fatigue resistance.

The rubber composition may include at least one of the oxycellulose fibers and the cellulose nanofibers in an amount of 0.1 to 60 parts by mass based on 100 parts by mass of the rubber.

The embodiments of the invention are described in detail below with reference to the drawings.

A. Raw Material

A-1. Aqueous Solution

The aqueous solution may be an aqueous solution that includes the oxycellulose fibers, an aqueous solution that includes the cellulose nanofibers, or an aqueous solution that includes the oxycellulose fibers and the cellulose nanofibers.

The aqueous solution that includes the oxycellulose fibers may be produced by performing an oxidation step that oxidizes natural cellulose fibers to obtain oxycellulose fibers, for example.

The aqueous solution that includes the cellulose nanofibers may be produced by a production method that includes an oxidation step that oxidizes natural cellulose fibers to obtain oxycellulose fibers, and a miniaturization step that miniaturizes the oxycellulose fibers, for example.

The aqueous solution that includes the oxycellulose fibers and the cellulose nanofibers may be obtained by mixing an aqueous solution that includes the oxycellulose fibers and an aqueous solution that includes the cellulose nanofibers.

In the oxidation step, water is added to natural cellulose fibers (raw material), and the mixture is processed using a mixer or the like to prepare a slurry in which the natural cellulose fibers are dispersed in water.

Examples of the natural cellulose fibers include wood pulp, cotton-based pulp, bacterial cellulose, and the like. Examples of the wood pulp include conifer-based pulp, broadleaf tree-based pulp, and the like. Examples of the cotton-based pulp include cotton linter, cotton lint, and the like. Examples of non-wood pulp include straw pulp, bagasse pulp, and the like. These natural cellulose fibers may be used either alone or in combination.

Natural cellulose fibers have a structure in which the space between cellulose microfibril bundles is filled with lignin and hemicellulose. Specifically, it is considered that natural cellulose fibers have a structure in which cellulose microfibrils and/or cellulose microfibril bundles are covered with hemicellulose, and the hemicellulose is covered with lignin. The cellulose microfibrils and/or the cellulose microfibril bundles are strongly bonded by lignin to form plant fibers. Therefore, it is preferable that lignin be removed from the plant fibers in advance in order to prevent aggregation of the cellulose fibers included in the plant fibers. The lignin content in the plant fiber-containing material is normally about 40 mass % or less, and preferably about 10 mass % or less. The lower limit of the lignin removal ratio is not particularly limited. It is preferable that the lignin removal ratio be as close to 0 mass % as possible. Note that the lignin content may be measured using the Klason method.

The minimum unit of cellulose microfibrils has a width of about 4 nm, and may be referred to as "single cellulose nanofiber". The term "cellulose nanofiber" used herein refers to a cellulose fiber obtained by untangling natural cellulose fibers and/or oxycellulose fibers to have a nano-size. The cellulose nanofibers may have an average fiber diameter of 1 to 200 nm, or may have an average fiber diameter of 1 to 150 nm. In particular, the cellulose nanofibers may be cellulose microfibrils and/or cellulose microfibril bundles having an average fiber diameter of 1 to 100 nm. Specifically, the cellulose nanofibers may include single cellulose nanofibers, or bundles of a plurality of single cellulose nanofibers.

The average aspect ratio (fiber length/fiber diameter) of the cellulose nanofibers may be 10 to 1000, or may be 10 to 500, or may be 100 to 350.

Note that the average fiber diameter and the average fiber length of the cellulose nanofibers refer to arithmetic mean values calculated from the values measured for at least fifty cellulose nanofibers within the field of view of an electron microscope.

In the oxidation step, the natural cellulose fibers are oxidized in water using an N-oxyl compound as an oxidizing catalyst to obtain oxycellulose fibers. Examples of the N-oxyl compound that may be used as the cellulose oxidizing catalyst include 2,2,6,6-tetramethyl-1-piperidine-N-oxyl (hereinafter may be referred to as "TEMPO"), 4-acetamide-TEMPO, 4-carboxy-TEMPO, 4-phosphonooxy-TEMPO, and the like.

A purification step that repeats washing with water and filtration may be performed after the oxidation step to remove impurities (e.g., unreacted oxidizing agent and by-products) from the slurry that includes the oxycellulose fibers. The solution that includes the oxycellulose fibers is in a state in which the oxycellulose fibers are impregnated with water, for example. Specifically, the oxycellulose fibers have not been untangled to cellulose nanofiber units. Water may be used as the solvent. Note that a water-soluble organic solvent (e.g., alcohol, ether, or ketone) may also be used corresponding to the objective.

The oxycellulose fibers include a carboxyl group since some of the hydroxyl groups have been modified with a substituent that includes a carboxyl group.

The oxycellulose fibers may have an average fiber diameter of 10 to 30 micrometers. Note that the average fiber diameter of the oxycellulose fibers refer to an arithmetic mean value calculated from the values measured for at least fifty oxycellulose fibers within the field of view of an electron microscope.

The oxycellulose fibers may be cellulose microfibril bundles. The oxycellulose fibers need not necessarily be untangled to cellulose nanofiber units in the mixing step and the drying step (described later). The oxycellulose fibers may be untangled to cellulose nanofibers in the miniaturization step.

In the miniaturization step, the oxycellulose fibers may be stirred in a solvent (e.g., water) to obtain cellulose nanofibers.

In the miniaturization step, water may be used as the solvent (dispersion medium). A water-soluble organic solvent (e.g., alcohol, ether, or ketone) may also be used either alone or in combination.

In the miniaturization step, the oxycellulose fibers may be stirred using a disintegrator, a refiner, a low-pressure homogenizer, a high-pressure homogenizer, a grinder, a cutter mill, a ball mill, a jet mill, a single-screw extruder, a twin-screw extruder, an ultrasonic stirrer, a domestic juicer mixer (juicing mixer), or the like.

In the miniaturization step, the solid content in the solution (solvent) that includes the oxycellulose fibers may be 50 mass % or less, for example. If the solid content exceeds 50 mass %, high energy may be required to achieve dispersion.

The aqueous solution that includes the cellulose nanofibers can be obtained by the miniaturization step. The aqueous solution that includes the cellulose nanofibers may be a colorless transparent suspension or a translucent suspension. The suspension has a configuration in which the cellulose nanofibers (i.e., fibers that have been surface-oxidized and untangled (miniaturized)) are dispersed in water. Specifically, the cellulose nanofibers are obtained by reducing the strong cohesive force (hydrogen bonds) between the microfibrils by introducing carboxyl groups in the oxidation step, and performing the miniaturization step. The carboxyl group content, the polarity, the average fiber diameter, the average fiber length, the average aspect ratio, and the like can be controlled by adjusting the oxidation conditions.

The aqueous solution thus obtained may include the cellulose nanofibers in a ratio of 0.1 to 10 mass %. The aqueous solution may be diluted so that the cellulose nanofiber content is 1 mass %. The aqueous solution may have a light transmittance of 40% or more, or 60% or more, or 80% or more. The transmittance of the aqueous solution may be measured using a UV spectrophotometer as the transmittance at a wavelength of 660 nm.

A-2. Rubber Latex

A natural rubber latex solution or a synthetic rubber latex solution may be used as the rubber latex.

A natural rubber/water-based solution that is a natural product due to the metabolic action of plants, and includes water as a dispersion solvent, may be used as the natural rubber latex solution. The synthetic rubber latex solution may be obtained by producing a styrene-butadiene-based rubber, a butadiene rubber, a methyl methacrylate-butadiene-based rubber, a 2-vinylpyridine-styrene-butadiene-based rubber, an acrylonitrile-butadiene-based rubber, a chloroprene rubber, a silicone rubber, a fluororubber, or the like by emulsion polymerization.

The rubber latex has a configuration in which a large number of rubber microparticles are dispersed in a dispersion solvent.

B. Method for Producing Rubber Composition

Figure 2:
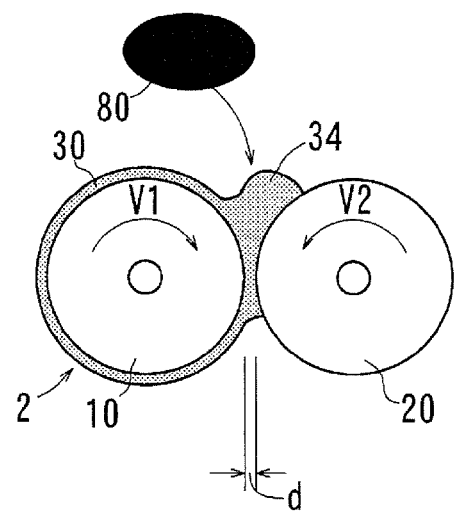
FIG. 2 is a diagram schematically illustrating a dispersion step included in a method for producing a rubber composition according to one embodiment of the invention.
Figure 3:
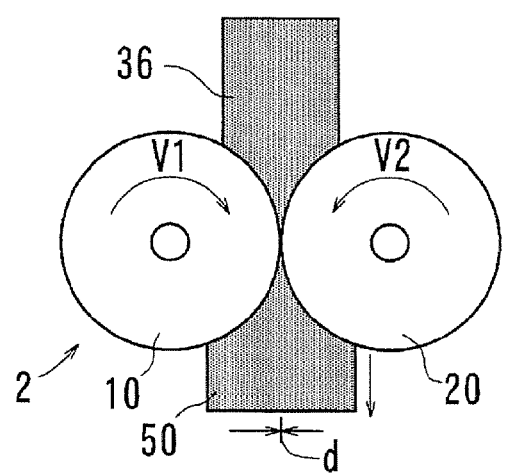
FIG. 3 is a diagram schematically illustrating a dispersion step included in a method for producing a rubber composition according to one embodiment of the invention.

FIGS. 1 to 3 are diagrams schematically illustrating the method for producing a rubber composition according to one embodiment of the invention.

The method for producing a rubber composition according to one embodiment of the invention includes a mixing step that mixes an aqueous solution that includes at least one of oxycellulose fibers and cellulose nanofibers with rubber latex to obtain a first mixture, a drying step that dries the first mixture to obtain a second mixture, and a dispersion step that tight-mills the second mixture using an open roll to obtain a rubber composition.

B-1. Mixing Step

In the mixing step, the aqueous solution that includes at least one of the oxycellulose fibers and the cellulose nanofibers is mixed with the rubber latex to obtain the first mixture. The mixing step may be implemented using a roll mixing method that utilizes a roll mixer, a stirring operation that utilizes a propeller stirrer, a homogenizer, a rotary stirrer, or an electromagnetic stirrer, a manual stirring operation, or the like. In particular, the mixing step may be implemented using the roll mixing method.

An open roll (open roll mill) may be used as the roll mixer used for the roll mixing method, for example. A double roll mill or a triple roll mill may be used as the roll mixer used for the roll mixing method, for example.

The mixture of the aqueous solution and the rubber latex is gradually supplied to the roll mixer in which the roll distance is set to a predetermined distance. The roll distance may be set so that the mixture of the aqueous solution and the rubber latex is wound around the rolls, but does not fall through the space between the rolls. The viscosity of the mixture supplied to the roll mixer gradually increases due to mixing. When the viscosity of the mixture has increased, the mixture may be removed from the roll mixer, and supplied to the roll mixer again after reducing the roll distance. This step may be performed a plurality of times.

It is considered that at least one of the oxycellulose fibers and the cellulose nanofibers enter the space between the rubber microparticles during the mixing step while the mixture passes through the rolls. In particular, the reinforcing effect due to the fibers can be improved by utilizing the roll mixing method as compared with the case of using another stirring operation.

The first mixture obtained by the mixing step may include at least one of the oxycellulose fibers and the cellulose nanofibers in an amount of 0.1 to 60 parts by mass based on 100 parts by mass of the rubber (on a solid basis) (mass ratio after the drying step). The reinforcing effect can be obtained when the first mixture includes at least one of the oxycellulose fibers and the cellulose nanofibers in an amount of 0.1 parts by mass or more. When the first mixture includes at least one of the oxycellulose fibers and the cellulose nanofibers in an amount of 60 parts by mass or less, it is possible to process the mixture after the drying step.

B-2. Drying Step

In the drying step, the first mixture obtained by the mixing step is dried to obtain the second mixture. For example, the drying step may be implemented using a normal method that removes water since the first mixture includes water. For example, the drying step may be implemented using a known drying method such as an air-drying method, an oven drying method, a freeze-drying method, a spray drying method, or a pulse combustion method.

The drying step may be performed at a temperature at which the rubber, the oxycellulose fibers, and the cellulose nanofibers are not thermally decomposed. For example, the first mixture may be dried by heating the first mixture at 100° C.

The second mixture includes the rubber component, and at least one of the oxycellulose fibers and the cellulose nanofibers. For example, the second mixture may include at least one of the oxycellulose fibers and the cellulose nanofibers in an amount of 0.1 to 60 parts by mass based on 100 parts by mass of the rubber. The second mixture may include at least one of the oxycellulose fibers and the cellulose nanofibers in an amount of 1 to 50 parts by mass. In particular, the second mixture may include at least one of the oxycellulose fibers and the cellulose nanofibers in an amount of 5 to 40 parts by mass. The rubber composition can be reinforced when the second mixture includes at least one of the oxycellulose fibers and the cellulose nanofibers in an amount of 0.1 parts by mass or more. It is possible to easily process the mixture when the second mixture includes at least one of the oxycellulose fibers and the cellulose nanofibers in an amount of 60 parts by mass or less.

B-3. Dispersion Step

In the dispersion step, the second mixture that includes at least one of the oxycellulose fibers and the cellulose nanofibers is tight-milled using the open roll to obtain the rubber composition.

As illustrated in FIG. 1, a second mixture 30 that is wound around a first roll 10 may be masticated before tight-milling the second mixture. The molecular chains of the rubber included in the second mixture are moderately cut by mastication to produce free radicals. The free radicals of the rubber produced by mastication easily bond to at least one of the oxycellulose fibers and the cellulose nanofibers.

As illustrated in FIG. 2, a compounding ingredient 80 may be appropriately supplied to a bank 34 of the second mixture 30 that is wound around the first roll 10, and the mixture may be mixed to obtain an intermediate mixture (mixing step). Examples of the compounding ingredient include a crosslinking agent, a vulcanizing agent, a vulcanization accelerator, a vulcanization retarder, a softener, a plasticizer, a curing agent, a reinforcing agent, a filler, an aging preventive, a colorant, an acid acceptor, and the like. These compounding ingredients may be added to the rubber at an appropriate timing during the mixing process.

The intermediate mixture 36 illustrated in FIGS. 1 and 2 may be obtained using an internal mixing method, a multi-screw extrusion kneading method, or the like instead of the open-roll method.

As shown in FIG. 3, the intermediate mixture may be tight-milled. The intermediate mixture 36 may be tight-milled at 0 to 50° C. using an open roll 2 that is set at a roll distance of 0.5 mm or less to obtain an uncrosslinked rubber composition 50 (tight-milling step). In the tight-milling step, the distance d between the first roll 10 and a second roll 20 is set to 0.5 mm or less, and preferably 0 to 0.5 mm, for example. The intermediate mixture 36 obtained as illustrated in FIG. 2 is supplied to the open roll 2, and tight-milled one or more times. The intermediate mixture 36 may be tight-milled about one to about ten times, for example. When the surface velocity of the first roll 10 is referred to as V1, and the surface velocity of the second roll 20 is referred to as V2, the surface velocity ratio (V1/V2) of the first roll 10 to the second roll 20 during tight-milling may be 1.05 to 3.00, and preferably 1.05 to 1.2. A desired shear force can be applied by utilizing such a surface velocity ratio.

The rubber composition 50 that is extruded through the narrow space between the rolls is deformed to a large extent due to a restoring force achieved by the elasticity of the rubber (see FIG. 3), and at least one of the oxycellulose fibers and the cellulose nanofibers move to a large extent together with the rubber. The rubber composition 50 obtained by tight-milling is rolled (sheeted) by the rolls to have a given thickness (e.g., 100 to 500 micrometers).

The tight-milling step may be performed while setting the roll temperature to 0 to 50° C. (or a relatively low temperature of 5 to 30° C.) in order to obtain as high a shear force as possible, for example. In this case, the measured temperature of the rubber composition is also adjusted to 0 to 50° C. (or 5 to 30° C.).

When the roll temperature is adjusted within the above range, it is possible to untangle at least one of the oxycellulose fibers and the cellulose nanofibers by utilizing the elasticity of the rubber, and disperse the untangled fibers in the rubber composition.

A high shear force is applied to the rubber during the tight-milling step, and at least one of the oxycellulose fibers and the cellulose nanofibers that have aggregated are separated and removed one by one by the molecules of the rubber, and become dispersed in the rubber. In particular, since the rubber has elasticity and viscosity, at least one of the oxycellulose fibers and the cellulose nanofibers can be untangled, and dispersed. The rubber composition 50 in which at least one of the oxycellulose fibers and the cellulose nanofibers exhibit excellent dispersibility and dispersion stability (i.e., at least one of the oxycellulose fibers and the cellulose nanofibers rarely reaggregate) can thus be obtained.

More specifically, when the rubber and at least one of the oxycellulose fibers and the cellulose nanofibers are mixed using the open roll, the viscous rubber enters the space between at least one of the oxycellulose fibers and the cellulose nanofibers. When the surface of at least one of the oxycellulose fibers and the cellulose nanofibers have been moderately activated by an oxidation treatment, for example, at least one of the oxycellulose fibers and the cellulose nanofibers are easily bonded to the molecules of the rubber. When a high shear force is then applied to the rubber, at least one of the oxycellulose fibers and the cellulose nanofibers move along with the movement of the molecules of the rubber. At least one of the oxycellulose fibers and the cellulose nanofibers that have aggregated are separated by the restoring force of the rubber due to elasticity after shearing, and become dispersed in the rubber. It is preferable to use the open-roll method since the actual temperature of the mixture can be measured and managed while managing the roll temperature.

B-4. Coagulation Step

The method for producing a rubber composition may further include a coagulation step that is performed between the mixing step and the drying step, the coagulation step coagulating the rubber latex included in the first mixture.

Since the first mixture obtained by the mixing step (see B-1) includes a large amount of water, it takes time to remove water in the drying step (see B-2). In the coagulation step, a specific amount of a known coagulant that coagulates rubber latex is added to the first mixture (aqueous solution), and the mixture is stirred (mixed). The rubber component included in the first mixture is thus coagulated by the coagulant. In the coagulation step, the coagulate may then be dehydrated and washed. The coagulate may be repeatedly dehydrated and washed a plurality of times.

It suffices that the coagulate be dehydrated so that water can be removed to such an extent that the drying time in the drying step can be reduced. The coagulated rubber component and water are separated to a certain extent by dehydrating the coagulate. The coagulate may be dehydrated using a rotary dehydrator (centrifuge), a rubber-covered roll, a press, or the like. The coagulate may be washed using water, for example.

A known latex coagulant may be appropriately selected as the coagulant taking account of the type of the rubber latex included in the first mixture. For example, a known acid or salt may be used as the coagulant. A polymer coagulant may be used instead of (or in addition to) a salt. Examples of an acid that may be used as the coagulant include formic acid, acetic acid, propionic acid, citric acid, oxalic acid, sulfuric acid, hydrochloric acid, carbonic acid, and the like. Examples of a salt that may be used as the coagulant include sodium chloride, aluminum sulfate, calcium nitrate, and the like. An anionic polymer coagulant, a cationic polymer coagulant, or a nonionic polymer coagulant may be used as the polymer coagulant.

Since a large amount of water can be removed from the first mixture by performing the coagulation step, it is possible to reduce the heating time in the drying step performed after the coagulation step, and improve the work efficiency.

C. Rubber Composition

The rubber composition according to one embodiment of the invention is obtained using the method for producing a rubber composition, and includes at least one of oxycellulose fibers and cellulose nanofibers that are dispersed therein in an untangled state.

The rubber composition according to one embodiment of the invention includes rubber, and at least one of oxycellulose fibers and cellulose nanofibers that are dispersed in the rubber in an untangled state, the rubber composition not including an aggregate that includes at least one of the oxycellulose fibers and the cellulose nanofibers, and has a diameter of 0.1 mm or more.

An aggregate that includes at least one of the oxycellulose fibers and the cellulose nanofibers is a mass of these fibers, and may be an aggregate of the oxycellulose fibers, an aggregate of the cellulose nanofibers, or an aggregate of the oxycellulose fibers and the cellulose nanofibers.

The rubber composition according to one embodiment of the invention does not include an aggregate, is reinforced by at least one of the oxycellulose fibers and the cellulose nanofibers that are dispersed therein in an untangled state, and exhibits excellent rigidity, strength, and fatigue resistance.

The rubber composition may include at least one of the oxycellulose fibers and the cellulose nanofibers in an amount of 0.1 to 60 parts by mass based on 100 parts by mass of the rubber.

A compounding ingredient that is normally used when processing rubber may be added to the rubber composition. A known compounding ingredient may be used as the compounding ingredient.

EXAMPLES

The invention is further described below by way of examples. Note that the invention is not limited to the following examples.

(1-1) Preparation of Samples of Examples 1 to 4

<Aqueous Solution Preparation Step>

Oxycellulose fibers and cellulose nanofibers were obtained using the method disclosed in Production Example 1 of JP-A-2013-18918.

Specifically, bleached conifer kraft pulp was sufficiently stirred in ion-exchanged water, and 1.25 mass % of TEMPO, 12.5 mass % of sodium bromide, and 28.4 mass % of sodium hypochlorite were sequentially added to 100 g of the pulp at 20° C. The pH of the mixture was adjusted to 10.5 by adding sodium hydroxide dropwise to the mixture to effect an oxidation reaction. When 120 minutes had elapsed, dropwise addition of sodium hydroxide was stopped to obtain an aqueous solution including 10 mass % of TEMPO-oxidized oxycellulose fibers. The oxycellulose fibers had a fiber diameter of 10 to 30 micrometers and a fiber length of 1 to 5 mm similar to those of the pulp.

The oxycellulose fibers were sufficiently washed with ion-exchanged water, and dehydrated. The solid content in the oxycellulose fibers was adjusted to 1 mass % using ion-exchanged water, and the oxycellulose fibers were miniaturized using a high-pressure homogenizer to obtain an aqueous dispersion including 1 mass % of cellulose nanofibers. The cellulose nanofibers had an average fiber diameter of 3.3 nm and an average aspect ratio of 225.

<Mixing Step>

Hydrogenated nitrile rubber (hereinafter referred to as "H-NBR") latex ("ZLx-B" manufactured by Zeon Corporation (aqueous dispersion having a solid content of 40 mass %)) was added to the aqueous dispersion including 1 mass % of the cellulose nanofibers, and the mixture was mixed using a juicer mixer (rotational speed: 10,000 rpm) to obtain a first mixture.

In Examples 2 to 4, the mixture was further mixed using a triple roll mill (M-50) (manufactured by EXAKT) in which the nip was set to 10 micrometers (rotational speed: 200 rpm) to obtain a first mixture.

<Drying Step>

The first mixture was heated and dried for 4 days in an oven that was set to 50° C. to obtain a second mixture. Table 1 shows the ratio (amount) of the components in the second mixture obtained by drying. Note that the unit for the amount shown in Tables 1 to 3 is parts by mass (phr).

<Dispersion Step>

The second mixture was masticated at a roll distance of 1.5 mm, supplied to an open roll (roll distance: 0.3 mm), and tight-milled at 10 to 30° C. to obtain a rubber composition sample. Note that the surface velocity ratio of two rolls was set to 1.1. The second mixture was repeatedly tight-milled five times.

<Vulcanization Step>

8 parts by mass of a peroxide (crosslinking agent) was added to the rubber composition sample obtained by tight milling, and the mixture was sheeted, and compression-molded at 170° C. for 10 minutes to obtain a sheet-shaped crosslinked rubber composition sample (thickness: 1 mm).

TABLE 1

|  | Example 1 | Example 2 | Example 3 | Example 4 |
| --- | --- | --- | --- | --- |
| H-NBR latex (dry weight) | 100 | 10 | 100 | 100 |
| Cellulose nanofibers | 20 | 5 | 10 | 20 |

(1-2) Preparation of Samples of Examples 5 to 7

<Mixing Step>

H-NBR latex ("ZLx-B" manufactured by Zeon Corporation) was added to an aqueous dispersion including 1 mass % of the TEMPO-oxidized oxycellulose fibers, and the mixture was mixed using a juicer mixer (rotational speed: 10,000 rpm) to obtain a first mixture.

In Examples 6 and 7, the mixture was further mixed using a triple roll mill (M-50) (manufactured by EXAKT) in which the nip was set to 10 micrometers (rotational speed: 200 rpm) to obtain a first mixture.

<Drying Step>

The first mixture was heated and dried for 4 days in an oven that was set to 50° C. to obtain a second mixture. Table 2 shows the ratio (amount) of the components included in the second mixture obtained by drying.

<Dispersion Step>

The second mixture was masticated at a roll distance of 1.5 mm, supplied to an open roll (roll distance: 0.3 mm), and tight-milled at 10 to 30° C. to obtain a rubber composition sample. Note that the surface velocity ratio of two rolls was set to 1.1. The second mixture was repeatedly tight-milled five times.

<Vulcanization Step>

8 parts by mass of a peroxide (crosslinking agent) was added to the rubber composition sample obtained by tight milling, and the mixture was sheeted, and compression-molded at 170° C. for 10 minutes to obtain a sheet-shaped crosslinked rubber composition sample (thickness: 1 mm).

TABLE 2

|  | Example 5 | Example 6 | Example 7 |
|---|---|---|---|
| H-NBR latex (dry weight) | 100 | 100 | 100 |
| Oxycellulose fibers | 10 | 5 | 10 |

(1-3) Preparation of Samples of Comparative Examples 1 and 2

In Comparative Example 1, H-NBR latex ("ZLx-B" manufactured by Zeon Corporation) was heated and dried for several days in an oven that was set to 50° C. to obtain a sample (pure rubber).

In Comparative Example 2, a sample was prepared in the same manner as in the examples of JP-A-2013-18918 (see below).

An aqueous solution including 1 mass % of TEMPO-oxidized oxycellulose fibers was subjected to a miniaturization process twice at 245 MPa using a high-pressure homogenizer ("Star Burst Labo HJP-25005" manufactured by Sugino Machine Ltd.) to obtain an aqueous solution including 1 mass % of cellulose nanofibers. H-NBR latex ("ZLx-B" manufactured by Zeon Corporation) was added to the aqueous dispersion including 1 mass % of the cellulose nanofibers, and the mixture was mixed using a juicer mixer (rotational speed: 10,000 rpm), and heated and dried for 4 days in an oven that was set to 50° C. to obtain a mixture including 50 mass % of the cellulose nanofibers. Table 3 shows the ratio (amount) of the components included in the mixture obtained by drying.

The mixture was supplied to a triple roll mill, and dried. After the addition of H-NBR latex in the amount shown in Table 3, the mixture was mixed, dried, and mixed using an open roll (roll distance: 1.5 mm). After the addition of 8 parts by weight of a peroxide (crosslinking agent), the mixture was sheeted, and compression-molded at 170° C. for 10 minutes to obtain a sheet-shaped crosslinked rubber composition sample (thickness: 1 mm).

TABLE 3

|  | Comparative Example 1 | Comparative Example 2 |
|---|---|---|
| H-NBR latex (dry weight) | 100 | 10 |
| Cellulose nanofibers | 0 | 10 |
| Additional H-NBR latex (dry weight) | 0 | 90 |

(2-1) Basic Property Test

The rubber hardness (Hs (JIS A)) of the rubber composition sample was measured in accordance with JIS K 6253.

A specimen was prepared by punching the rubber composition sample in the shape of a JIS No. 6 dumbbell. The specimen was subjected to a tensile test in accordance with JIS K 6251 at a temperature of 23±2° C. and a tensile rate of 500 mm/min using a tensile tester (manufactured by Shimadzu Corporation) to measure the tensile strength (TS (MPa)), the elongation at break (Eb (%)), the 50% modulus ($\sigma$50 (MPa)), and the 100% modulus ($\sigma$100 (MPa)).

A JIS K 6252 angle specimen (uncut) was prepared using the rubber composition sample. The specimen was subjected to a tear test in accordance with JIS K 6252 at a tensile rate of 500 mm/min using an instrument "Autograph AG-X" (manufactured by Shimadzu Corporation) to measure the maximum tearing force (N) to determine the tear strength (Tr (N/mm)).

A strip-shaped specimen (40×1×2 (width) mm) was prepared using the rubber composition sample. The specimen was subjected to a dynamic viscoelasticity test in accordance with JIS K 6394 using a dynamic viscoelasticity tester ("DMS6100" manufactured by SII) at a chuck distance of 20 mm, a measurement temperature of −100 to 300° C. (temperature increase rate: 3° C./min), a dynamic strain of ±0.05%, and a frequency of 1 Hz to measure the storage modulus (E' (MPa)) at a temperature range of −50° C. to 260° C. The measurement results are shown in Tables 4 and 5.

TABLE 4

|  |  | Comparative Example 1 | Comparative Example 2 | Example 1 | Example 2 | Example 3 | Example 4 |
|---|---|---|---|---|---|---|---|
| Hs | JIS A | 55 | 65 | 82 | 66 | 70 | 81 |
| TS | MPa | 14.0 | 14.3 | 21.0 | 14.5 | 15.3 | 22.2 |
| Eb | % | 400 | 390 | 390 | 390 | 380 | 340 |
| $\sigma$50 | MPa | 1.0 | 1.7 | 4.9 | 1.5 | 2.5 | 5.8 |
| $\sigma$100 | MPa | 1.2 | 2.0 | 7.6 | 2.1 | 3.7 | 9.9 |
| Tr | N/mm | 20.4 | 35.0 | 56.0 | 31.5 | 44.2 | 57.0 |
| E' (25° C.) | MPa | 3.4 | 10.8 | 44.2 | 9.2 | 14.6 | 53.4 |
| E' (150° C.) | MPa | 2.5 | 6.7 | 41.9 | 6.3 | 9.4 | 38.0 |
| E' (175° C.) | MPa | 2.6 | 5.8 | 34.0 | 5.9 | 8.2 | 33.3 |
| E' (200° C.) | MPa | 2.7 | 4.5 | 24.2 | 5.3 | 6.6 | 23.1 |

As is clear from the results shown in Table 4, the rubber compositions of Examples 1 to 4 that were reinforced by the cellulose nanofibers exhibited improved tensile strength, 50% modulus, 100% modulus, tear strength, and storage modulus. In particular, the rubber composition of Example 3 exhibited improved tensile strength, 50% modulus, 100% modulus, tear strength, and storage modulus as compared with the rubber composition of Comparative Example 2 including the cellulose nanofibers in an amount of 10 parts by mass.

TABLE 5

|  |  | Comparative Example 1 | Example 5 | Example 6 | Example 7 |
|---|---|---|---|---|---|
| Hs | JIS A | 55 | 67 | 62 | 68 |
| TS | MPa | 14.0 | 17.5 | 10.9 | 18.7 |

TABLE 5-continued

|   |   | Comparative Example 1 | Example 5 | Example 6 | Example 7 |
|---|---|---|---|---|---|
| Eb | % | 400 | 420 | 400 | 430 |
| σ50 | MPa | 1.0 | 1.5 | 1.3 | 2.2 |
| σ100 | MPa | 1.2 | 1.8 | 1.8 | 3.4 |
| Tr | N/mm | 20.4 | 30.0 | 27.7 | 33.8 |
| E' (25° C.) | MPa | 3.4 | 7.2 | 5.3 | 8.0 |
| E' (150° C.) | MPa | 2.5 | 5.1 | 3.5 | 5.2 |

TABLE 5-continued

|   |   | Comparative Example 1 | Example 5 | Example 6 | Example 7 |
|---|---|---|---|---|---|
| E' (175° C.) | MPa | 2.6 | 5 | 3.5 | 5.1 |
| E' (200° C.) | MPa | 2.7 | 4.8 | 3.6 | 5.0 |

As is clear from the results shown in Table 5, the rubber compositions of Examples 5 to 7 that were reinforced by the cellulose nanofibers exhibited improved tensile strength, 50% modulus, 100% modulus, tear strength, and storage modulus.

(2-2) Observation Using Optical Microscope

The fracture surface of the rubber composition sample subjected to the tensile test was observed using an optical microscope ("Digital Microscope KG-7700" manufactured by Hirox) to determine the presence or absence of an aggregate of the cellulose nanofibers or the oxycellulose fibers.

No aggregate was observed in the rubber composition samples of Examples 1 to 7. On the other hand, a number of aggregates having a diameter of 0.1 mm or more were observed in the rubber composition sample of Comparative Example 2.

Figure 4:
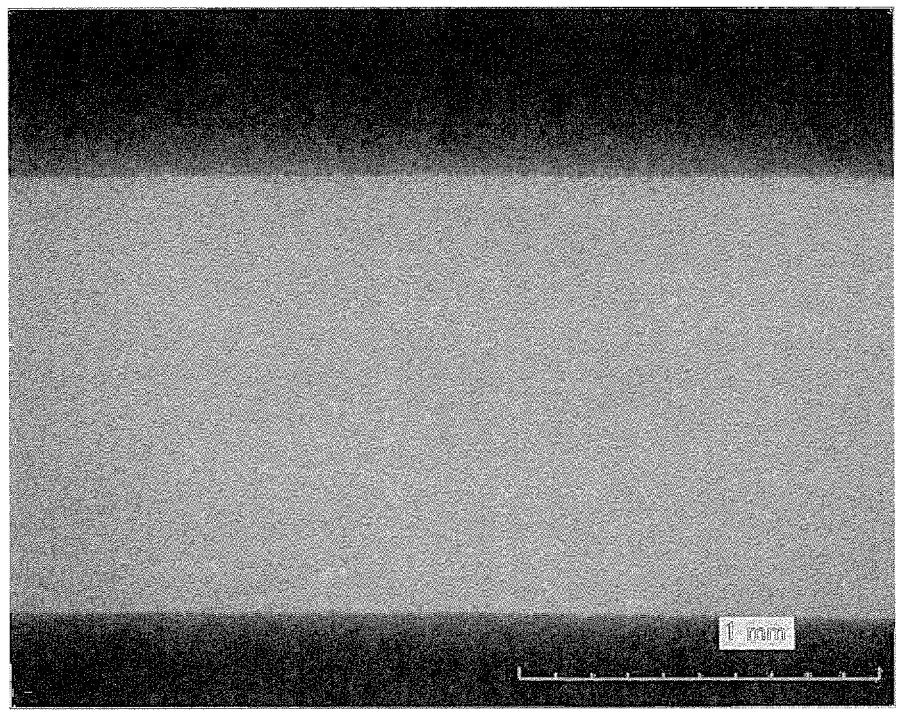
FIG. 4 is an optical micrograph of the rubber composition of Comparative Example 1.
Figure 5:
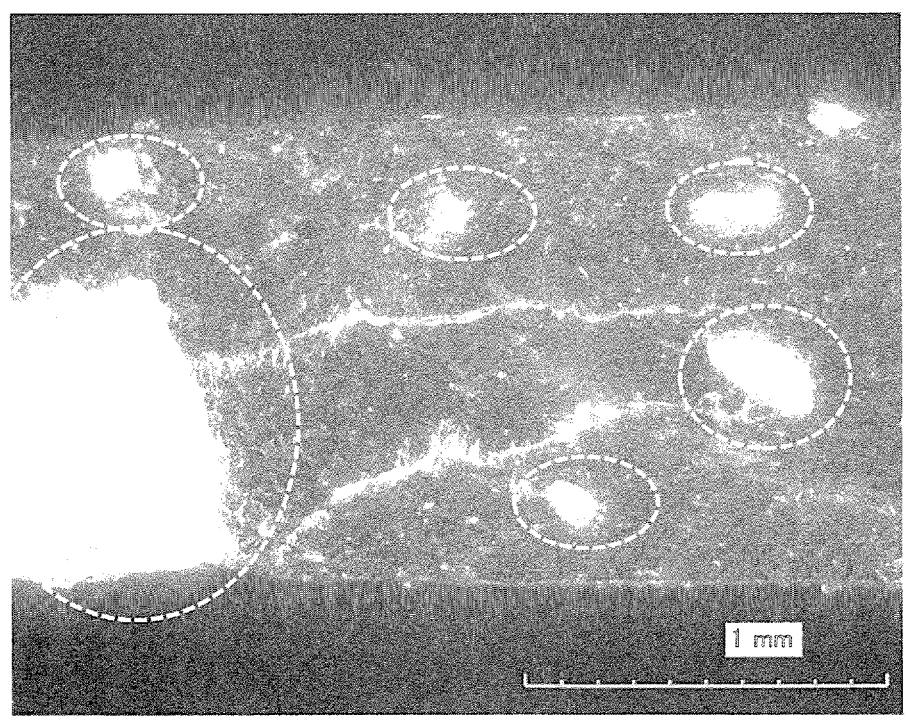
FIG. 5 is an optical micrograph of the rubber composition of Comparative Example 2.
Figure 6:
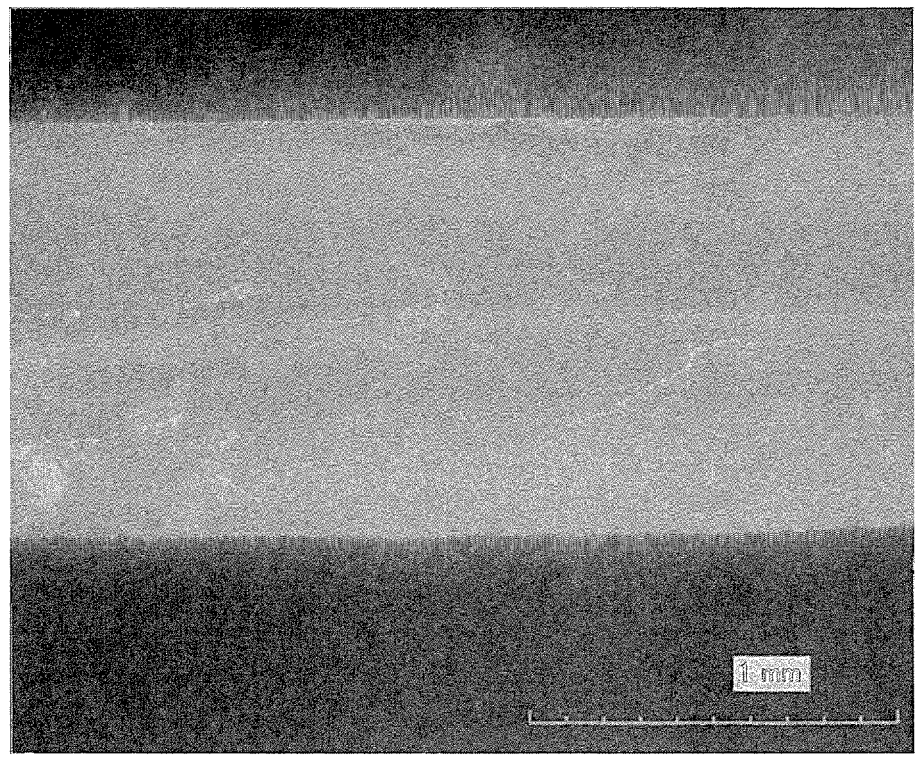
FIG. 6 is an optical micrograph of the rubber composition of Example 1.
Figure 7:
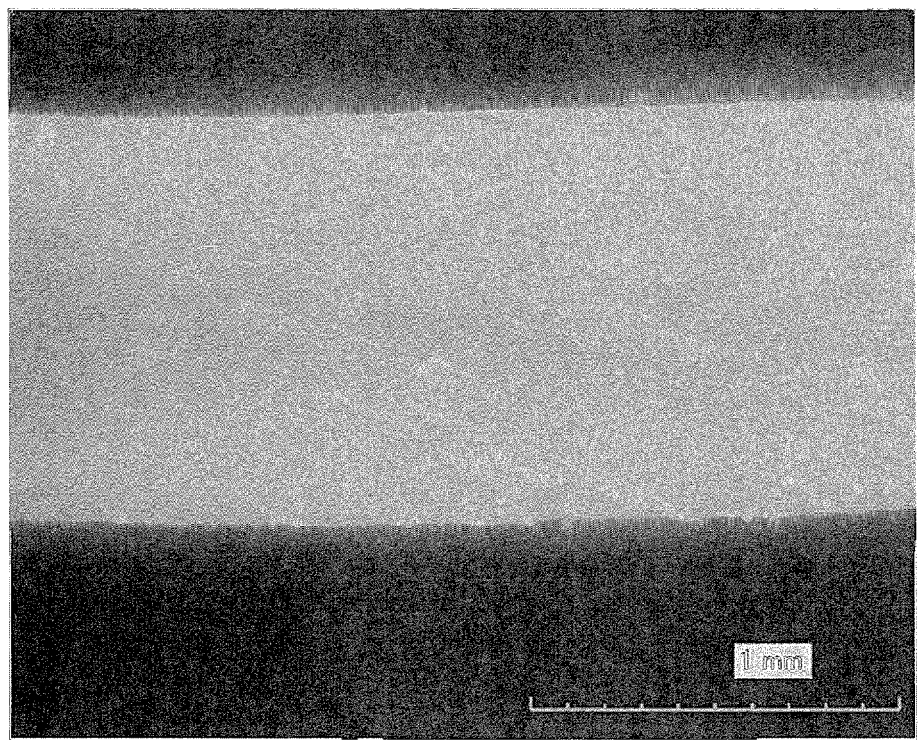
FIG. 7 is an optical micrograph of the rubber composition of Example 4.
Figure 8:
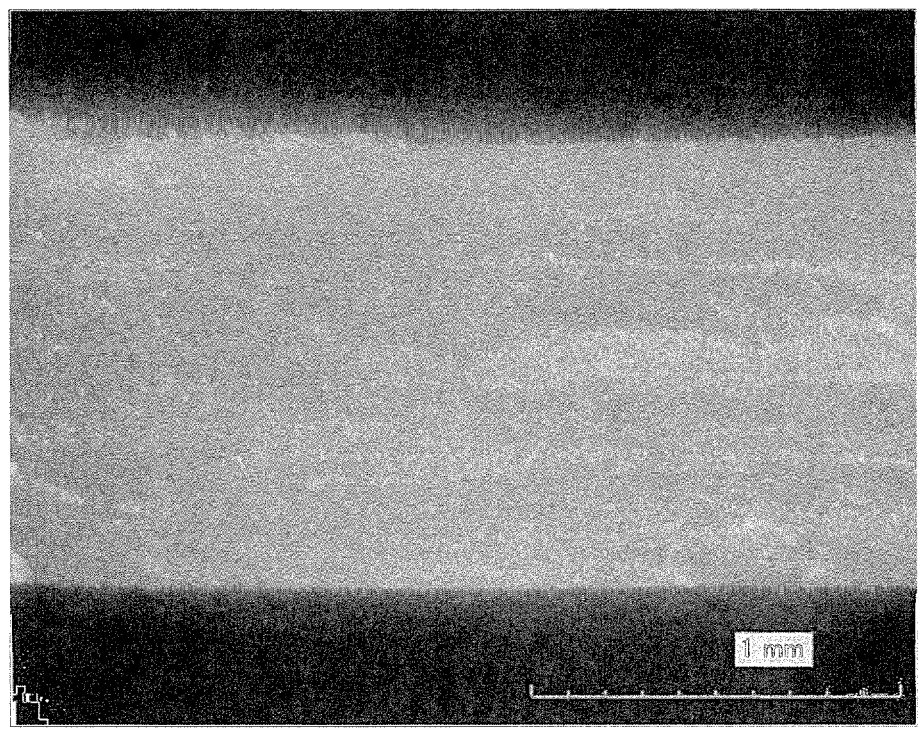
FIG. 8 is an optical micrograph of the rubber composition of Example 7.

FIG. 4 is an optical micrograph of the rubber composition of Comparative Example 1. FIG. 5 is an optical micrograph of the rubber composition of Comparative Example 2. FIG. 6 is an optical micrograph of the rubber composition of Example 1. FIG. 7 is an optical micrograph of the rubber composition of Example 4. FIG. 8 is an optical micrograph of the rubber composition of Example 7. In FIGS. 4 to 8, the gray area situated between the upper black area and the lower black area corresponds to the rubber composition sample.

An aggregate of the cellulose nanofibers is not observed in the rubber composition samples shown in FIGS. 4 and 6 to 8. On the other hand, white aggregates of the cellulose nanofibers are observed in the rubber composition sample shown in FIG. 5 (see the areas enclosed by the broken line).

(2-3) Tear Fatigue Life Test

A specimen was prepared by punching the rubber composition sample in the shape of a strip (10 mm×4 mm (width)×1 mm (thickness)) (the long side was the grain direction). A cut (depth: 1 mm) was formed in the specimen in the widthwise direction from the center of the long side using a razor blade. The specimen was subjected to a tear fatigue test using a tester "TMA/SS6100" (manufactured by SII) by repeatedly applying a tensile load (1 to 4 N/mm) to the specimen in air at a temperature of 120° C. and a frequency of 1 Hz in a state in which each end of the specimen was held using a chuck in the vicinity of the short side to measure the number of times that the tensile load was applied until the specimen broke to determine the tear fatigue life (see "Number of tear fatigue cycles" in Tables 6 and 7). The tensile load was applied up to 200,000 times when the specimen did not break. The measurement results are shown in Tables 6 and 7.

TABLE 6

|   | Load | Comparative Example 1 | Comparative Example 2 | Example 1 | Example 2 | Example 3 | Example 4 |
|---|---|---|---|---|---|---|---|
| Number of tear fatigue cycles | 1.0 N/mm | 430 | 2300 | — | 5730 | 200,000 | — |
|   | 2.0 N/mm | 1 | 50 | 200,000 | 130 | 700 | 200,000 |
|   | 3.0 N/mm | — | 1 | 31,840 | 20 | 50 | 38,360 |
|   | 4.0 N/mm | — | — | 160 | 1 | 20 | 120 |

As is clear from the results shown in Table 6, the rubber compositions of Examples 1 to 4 that were reinforced by the cellulose nanofibers exhibited an improved tear fatigue life. In particular, the rubber composition of Example 3 exhibited an improved tear fatigue life as compared with the rubber composition of Comparative Example 2 including the cellulose nanofibers in an amount of 10 parts by mass.

TABLE 7

|   | Load | Comparative Example 1 | Example 5 | Example 6 | Example 7 |
|---|---|---|---|---|---|
| Number of tear fatigue cycles | 1.0 N/mm | 430 | 9500 | 3310 | 10,360 |
|   | 2.0 N/mm | 1 | 50 | 20 | 80 |
|   | 3.0 N/mm | — | 6 | 1 | 10 |
|   | 4.0 N/mm | — | — | — | 1 |

As is clear from the results shown in Table 7, the rubber compositions of Examples 5 to 7 that were reinforced by the cellulose nanofibers exhibited an improved tear fatigue life.

(3) Measurement of Volume Resistivity

Carbon nanotubes having an average diameter of 15 nm ("MWCNT" in Table 8) and SAF grade carbon black ("CB" in Table 8) were supplied to an open roll (roll distance: 0.3 mm) in the ratio shown in Table 8, and tight-milled to obtain a rubber composition sample (Comparative Examples 3 to 5). The rubber composition sample was crosslinked in the same manner as described above (see Examples 1 to 7).

The volume resistivity of the rubber composition sample was measured. The measurement results are shown in Table 9.

TABLE 8

|   | Comparative Example 3 | Comparative Example 4 | Comparative Example 5 |
|---|---|---|---|
| H-NBR latex (dry weight) | 100 | 100 | 100 |
| MWCNT | 10 | 20 | 0 |
| CB | 0 | 0 | 60 |

TABLE 9

| | | Comparative Example 3 | Comparative Example 4 | Comparative Example 5 | Example 3 | Example 4 | Example 7 |
|---|---|---|---|---|---|---|---|
| Hs | JIS A | 75 | 86 | 85 | 70 | 81 | 68 |
| TS | MPa | 27.6 | 29.3 | 33.8 | 15.3 | 22.2 | 18.7 |
| Eb | % | 461 | 325 | 323 | 380 | 340 | 430 |
| σ50 | MPa | 3.2 | 7.9 | 3.5 | 2.5 | 5.8 | 2.2 |
| σ100 | MPa | 7.2 | 18.0 | 7.2 | 3.7 | 9.9 | 3.4 |
| Tr | N/mm | 96.8 | 124.9 | 76.1 | 44.2 | 57.0 | 33.8 |
| E' (25° C.) | MPa | 22.4 | 109.5 | 69.0 | 14.6 | 53.4 | 8.0 |
| E' (150° C.) | MPa | 7.0 | 24.3 | 14.1 | 9.4 | 38.0 | 5.2 |
| E' (175° C.) | MPa | 7.4 | 24.5 | 14.1 | 8.2 | 33.3 | 5.1 |
| E' (200° C.) | MPa | 7.6 | 24.5 | 13.5 | 6.6 | 23.1 | 5.0 |
| Volume resistivity | Ω · cm | 1.70E+01 | 2.10E+00 | 4.80E+02 | 1.09E+08 | 1.42E+09 | 9.20E+09 |

It was thus confirmed that the rubber composition samples of Examples 3 to 7 were reinforced while maintaining high insulating properties.

(4-1) Preparation of Samples of Examples 8 and 9

Sheet-shaped crosslinked rubber composition samples of Examples 8 and 9 were obtained in the same manner as in Example 4 (see (1-1)), except that a homogenizer (Example 8) or a rotary stirrer (Example 9) was used in the mixing step instead of the triple roll mill. Table 10 shows the ratio (amount) of the components used in Examples 8 and 9.

In Example 8, a homogenizer "US-300TS" (manufactured by Nihonseiki Kaisha Ltd.) was used as the homogenizer, and the mixture was mixed at 300 W for 20 minutes. In Example 9, a planetary centrifugal mixer "ARE-310" (manufactured by THINKY Corporation) was used as the rotary stirrer, and the mixture was mixed at 2000 rpm for 5 minutes.

TABLE 10

| | Example 8 | Example 9 |
|---|---|---|
| H-NBR latex (dry weight) | 100 | 100 |
| Cellulose nanofibers | 20 | 20 |

(4-2) Basic Property Test

The rubber hardness (Hs (JIS A)), the tensile strength (TS (MPa)), the elongation at break (Eb (%)), the 50% modulus (σ50 (MPa)), the 100% modulus (σ100 (MPa)), the tear strength (Tr (N/mm)), and the storage modulus (E' (MPa)) (temperature range: 25 to 200° C.) of the rubber composition samples of Examples 8 and 9 were measured in the same manner as described above (see (2-1)). The measurement results are shown in Table 11.

TABLE 11

| | | Example 8 | Example 9 |
|---|---|---|---|
| Hs | JIS A | 85 | 85 |
| TS | MPa | 24.4 | 25.9 |
| Eb | % | 350 | 390 |
| σ50 | MPa | 6.6 | 5.8 |
| σ100 | MPa | 11.3 | 9.6 |
| Tr | N/mm | 89.3 | 86.6 |
| E' (25° C.) | MPa | 66.3 | 56.0 |
| E' (150° C.) | MPa | 37.2 | 31.1 |
| E' (175° C.) | MPa | 31.8 | 26.7 |
| E' (200° C.) | MPa | 22.6 | 19.5 |

As is clear from the results shown in Table 11, the rubber compositions of Examples 8 and 9 that were reinforced by the cellulose nanofibers exhibited improved tensile strength, 50% modulus, 100% modulus, tearing strength, and storage modulus as compared with the rubber compositions of Comparative Examples 1 and 2. The rubber compositions of Examples 8 and 9 exhibited slightly low storage modulus at 150 to 200° C. as compared the rubber composition of Example 4 in which the mixture was mixed using the triple roll mill.

(4-3) Tear Fatigue Life Test

The rubber compositions of Examples 8 and 9 were subjected to a tear fatigue life test in the same manner as described above (see (2-3)) to measure the number of times that the tensile load was applied until the specimen broke. The tensile load was applied up to 200,000 times when the specimen did not break. The measurement results are shown in Table 12.

TABLE 12

| | Load | | Example 8 | Example 9 |
|---|---|---|---|---|
| Number of tear fatigue cycles | 1.0 | N/mm | — | — |
| | 2.0 | N/mm | 200,000 | 200,000 |
| | 3.0 | N/mm | 27,550 | 30,210 |
| | 4.0 | N/mm | 100 | 110 |

As is clear from the results shown in Table 12, the rubber compositions of Examples 8 and 9 that were reinforced by the cellulose nanofibers exhibited an improved tear fatigue life as compared with the rubber compositions of Comparative Examples 1 and 2. When subjecting the rubber compositions of Examples 8 and 9 to the tear fatigue life test, the number of times that the tensile load was applied until the specimen broke was small as compared with the rubber composition of Example 4 when the load was 3.0 or 4.0 N/mm.

(5-1) Preparation of Sample of Example 10

A sheet-shaped crosslinked rubber composition sample of Example 10 was obtained in the same manner as in Example 4 (see (1-1)), except that a coagulation step was performed between the mixing step and the drying step, and the drying step was performed for 2 days (i.e., the drying time was reduced by 2 days as compared with Example 4). Table 13 shows the ratio (amount) of the components used in Example 10.

In the coagulation step, a coagulant (5 parts by mass based on 100 parts by mass of the rubber component included in the first mixture) was added to the first mixture (aqueous solution) obtained by the mixing step in the same manner as in Example 4, and the mixture was stirred (mixed). The rubber component was coagulated by the coagulant. The resulting coagulate was repeatedly dehydrated and washed with water three times.

The coagulate was dehydrated using a rotary dehydrator. A 20% methanol solution of a cyclohexylamine salt of acetic acid was used as the coagulant.

TABLE 13

|  | Example 10 |
|---|---|
| H-NBR latex (dry weight) | 100 |
| Cellulose nanofibers | 5 |

(5-2) Basic Property Test

The rubber hardness (Hs (JIS A)), the tensile strength (TS (MPa)), the elongation at break (Eb (%)), the 50% modulus ($\sigma 50$ (MPa)), the 100% modulus ($\sigma 100$ (MPa)), the tear strength (Tr (N/mm)), and the storage modulus (E' (MPa)) (temperature range: 25 to 200° C.) of the rubber composition sample of Example 10 were measured in the same manner as described above (see (2-1)). The measurement results are shown in Table 14.

TABLE 14

|  |  | Example 10 |
|---|---|---|
| Hs | JIS A | 67 |
| TS | MPa | 23.6 |
| Eb | % | 590 |
| $\sigma 50$ | MPa | 1.6 |
| $\sigma 100$ | MPa | 2.1 |
| Tr | N/mm | 31.5 |
| E' (25° C.) | MPa | 8.1 |
| E' (150° C.) | MPa | 5.3 |
| E' (175° C.) | MPa | 5.1 |
| E' (200° C.) | MPa | 4.5 |

As is clear from the results shown in Table 14, the rubber composition of Example 10 that was reinforced by the cellulose nanofibers exhibited improved tensile strength, 50% modulus, 100% modulus, tearing strength, and storage modulus as compared with the rubber compositions of Comparative Examples 1 and 2.

(5-3) Tear Fatigue Life Test

The rubber composition of Example 10 was subjected to a tear fatigue life test in the same manner as described above (see (2-3)) to measure the number of times that the tensile load was applied until the specimen broke. The measurement results are shown in Table 15.

TABLE 15

|  | Load |  | Example 10 |
|---|---|---|---|
| Number of tear fatigue cycles | 1.0 | N/mm | 4830 |
|  | 2.0 | N/mm | 120 |
|  | 3.0 | N/mm | 10 |
|  | 4.0 | N/mm | 1 |

As is clear from the results shown in Table 15, the rubber composition of Example 10 that was reinforced by the cellulose nanofibers exhibited an improved tear fatigue life as compared with the rubber compositions of Comparative Examples 1 and 2.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A method for producing a rubber composition comprising:
a mixing step that mixes an aqueous solution that includes at least one of oxycellulose fibers and cellulose nanofibers with rubber latex using an open roll to obtain a first mixture;
a drying step that dries the first mixture to obtain a second mixture; and
a dispersion step that tight-mills the second mixture using an open roll to obtain a rubber composition,
wherein the mixing step includes repeating the following steps (1) to (4) a plurality of times:
(1) mixing the aqueous solution and the rubber latex using the open roll to obtain a mixture;
(2) removing the mixture from the open roll when the viscosity of the mixture has increased;
(3) after step (2), reducing a roll distance of the open roll; and
(4) after step (3), supplying the mixture to the open roll again,
wherein the mixing step obtains the first mixture in which at least one of the oxycellulose fibers and the cellulose nanofibers enter rubber microparticles in the rubber latex by repeatedly performing the steps (1) to (4),
wherein the aqueous solution includes at least one of the oxycellulose fibers and the cellulose nanofibers in a ratio of 0.1 to 10 mass %, and
wherein the dispersion step tight-mills the second mixture that includes at least one of the oxycellulose fibers and the cellulose nanofibers in an amount of 0.1 to 60 parts by mass based on 100 parts by mass of rubber, using the open roll at a roll distance of 0 to 0.5 mm and a roll temperature of 0 to 50° C.

2. The method for producing a rubber composition as defined in claim 1, wherein the oxycellulose fibers have an average fiber diameter of 10 to 30 micrometers, and the cellulose nanofibers have an average fiber diameter of 1 to 200 nm.

3. The method for producing a rubber composition as defined in claim 1, further comprising: a coagulation step that is performed between the mixing step and the drying step, the coagulation step coagulating the rubber latex included in the first mixture.

* * * * *